US006655096B1

(12) United States Patent
Pryor

(10) Patent No.: US 6,655,096 B1
(45) Date of Patent: Dec. 2, 2003

(54) DRAG STRUT CONNECTOR

(75) Inventor: Steven E. Pryor, Dublin, CA (US)

(73) Assignee: Simpson Strong-Tie Company, Inc., Dublin, CA (US)

( * ) Notice: Subject to any disclaimer, the term of this patent is extended or adjusted under 35 U.S.C. 154(b) by 0 days.

(21) Appl. No.: 09/418,954

(22) Filed: Oct. 14, 1999

(51) Int. Cl.[7] ................................................ E04B 7/04
(52) U.S. Cl. ........................................ 52/92.2; 52/712
(58) Field of Search ....................... 52/712, 92.3, 93.2, 52/92.1, 93.1, 92.2

(56) References Cited

U.S. PATENT DOCUMENTS

| | | |
|---|---|---|
| 1,036,439 A | 8/1912 | Brown |
| 1,657,243 A | 1/1928 | Daniels |
| 2,321,221 A | 6/1943 | Linehan |
| 2,372,768 A | 4/1945 | Davison |
| 2,413,362 A | 12/1946 | Maxwell et al. |
| 2,477,163 A | 7/1949 | Barnett |

(List continued on next page.)

OTHER PUBLICATIONS

Teco, "Structural Wood Fasteners," Rough Carpentry Wood Framing Systems, Teco Products, (Jun. 1972).
Simpson Strong-Tie, "Wood Construction Connectors," Catalog C-99, Simpson Strong-Tie Co., Inc., p. 15, 21, 30, 31, 33-35, 40, 42, 43, 48-55, 57-61, 63, 65, 74-78 (1998).
Simpson Strong-Tie, "TBE Truss Bearing Enhancer," Form F-TB5/THJA 3/91, Simpson Strong-Tie Co., Inc., (1991).
Steven E. Pryor, "Prior Art," Applicant's illustration of the connector of the prior art, an angle iron with a piece cut out to form a base member and side member with bolt holes in each., 1999.
Steven E. Pryor, "Applicant's affidavit describing the connector of the prior art.," (Aug. 14, 2002).

*Primary Examiner*—Peter M. Cuomo
*Assistant Examiner*—Stephen Vu
(74) *Attorney, Agent, or Firm*—James R. Cypher; Charles R. Cypher

(57) ABSTRACT

A connector for attaching walls to beams or trusses that are offset from the wall and act as collectors in the lateral force resisting system. The main purpose of a drag strut connector is to connect a beam or truss to the top plate of a colinear bearing wall, thereby completing the load path and allowing loads to be transferred out of the roof or floor sheathing into the wall system where the shearwalls are. Such a beam or truss is referred to as a load "collector" or "drag strut". The key to this connection is that it uses self-drilling screws to create a superior connection to that achieved with a similar connector and bolts.

30 Claims, 9 Drawing Sheets

U.S. PATENT DOCUMENTS

| | | | |
|---|---|---|---|
| 2,796,642 A | * | 6/1957 | Woodworth .............. 52/93.1 X |
| 2,871,752 A | | 2/1959 | Stern |
| 2,988,854 A | | 6/1961 | McKinley |
| 3,056,234 A | | 10/1962 | Nelsson |
| 3,256,030 A | | 6/1966 | Banse |
| 3,333,875 A | * | 8/1967 | Tracy ...................... 52/92.2 X |
| 3,478,639 A | | 11/1969 | Gruca |
| 3,633,950 A | | 1/1972 | Gilb |
| 3,727,358 A | | 4/1973 | Howell |
| 3,854,268 A | | 12/1974 | Gutner |
| 4,230,416 A | | 10/1980 | Gilb |
| 4,291,996 A | | 9/1981 | Gilb |
| 4,410,294 A | | 10/1983 | Gilb et al. |
| 4,423,977 A | | 1/1984 | Gilb |
| 4,480,941 A | | 11/1984 | Gilb et al. |
| 4,498,801 A | | 2/1985 | Gilb |
| 4,665,672 A | | 5/1987 | Commins et al. |
| 4,669,235 A | * | 6/1987 | Reinen .................... 52/92.2 X |
| 4,713,923 A | | 12/1987 | Sielaff et al. |
| 4,730,969 A | | 3/1988 | Dohi |
| 4,834,602 A | | 5/1989 | Takasaki |
| 4,932,173 A | | 6/1990 | Commins |
| 5,004,369 A | | 4/1991 | Young |
| 5,109,646 A | | 5/1992 | Colonias et al. |
| 5,160,211 A | | 11/1992 | Gilb |
| 5,199,839 A | | 4/1993 | DeHaitre |
| 5,230,198 A | * | 7/1993 | Callies ...................... 52/712 X |
| 5,236,273 A | | 8/1993 | Gilb |
| 5,324,132 A | | 6/1994 | Hunter et al. |
| 5,335,469 A | | 8/1994 | Stuart |
| 5,380,115 A | | 1/1995 | Colonias |
| 5,457,928 A | * | 10/1995 | Sahnazarian .............. 52/712 X |
| 5,516,248 A | | 5/1996 | DeHaitre |
| 5,528,875 A | | 6/1996 | Ziegler, Jr. et al. |
| 5,560,156 A | | 10/1996 | McDonald |
| 5,603,580 A | | 2/1997 | Leek et al. |
| 5,653,079 A | * | 8/1997 | Loeffler et al. ............... 52/712 |
| 5,732,524 A | | 3/1998 | Kalker, Jr. et al. |
| 5,809,719 A | | 9/1998 | Ashton et al. |
| 5,813,181 A | | 9/1998 | Ashton et al. |
| 5,921,042 A | | 7/1999 | Ashton et al. |
| 5,992,126 A | | 11/1999 | Ashton et al. |
| 6,022,165 A | * | 2/2000 | Lin ........................... 52/712 X |
| 6,109,850 A | | 8/2000 | Commins |
| 6,230,466 B1 | * | 5/2001 | Pryor ....................... 52/712 X |

\* cited by examiner

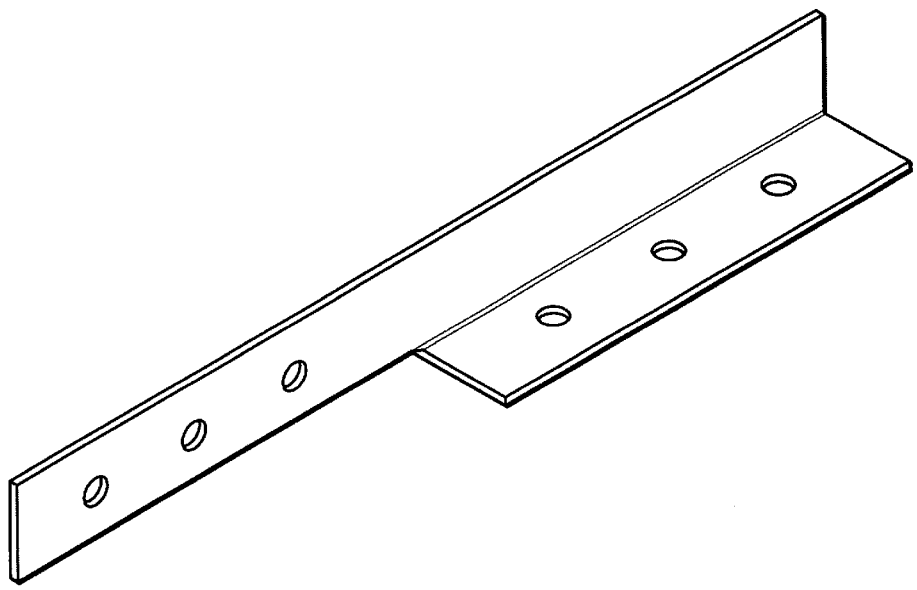
FIG._1A
(PRIOR ART)
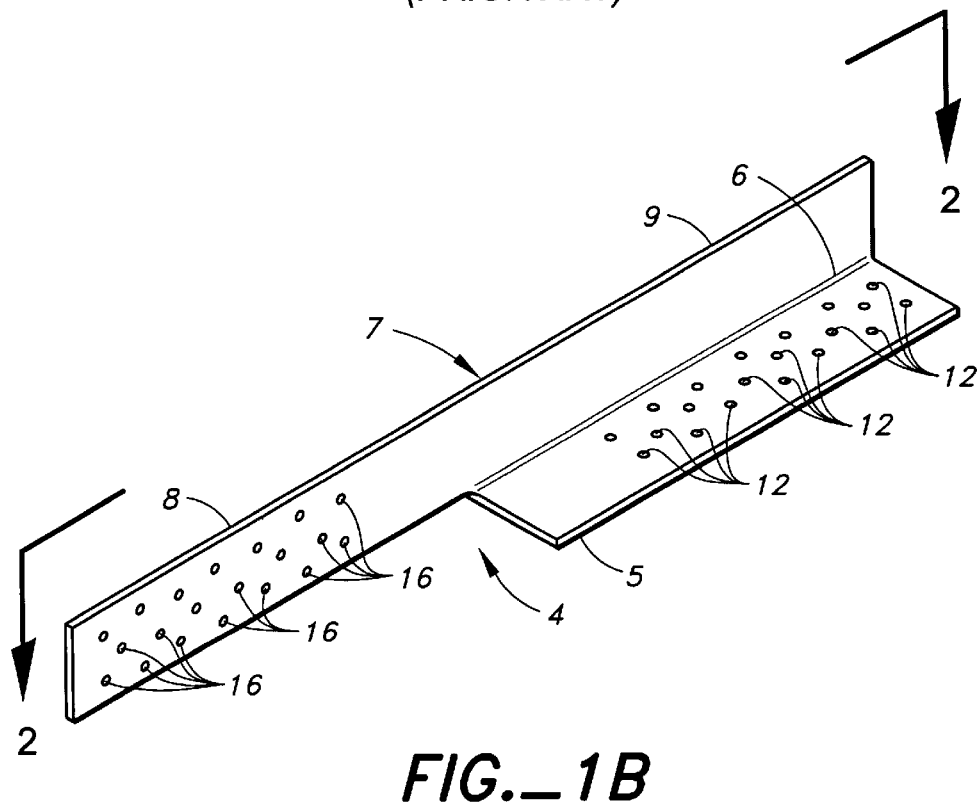
FIG._1B

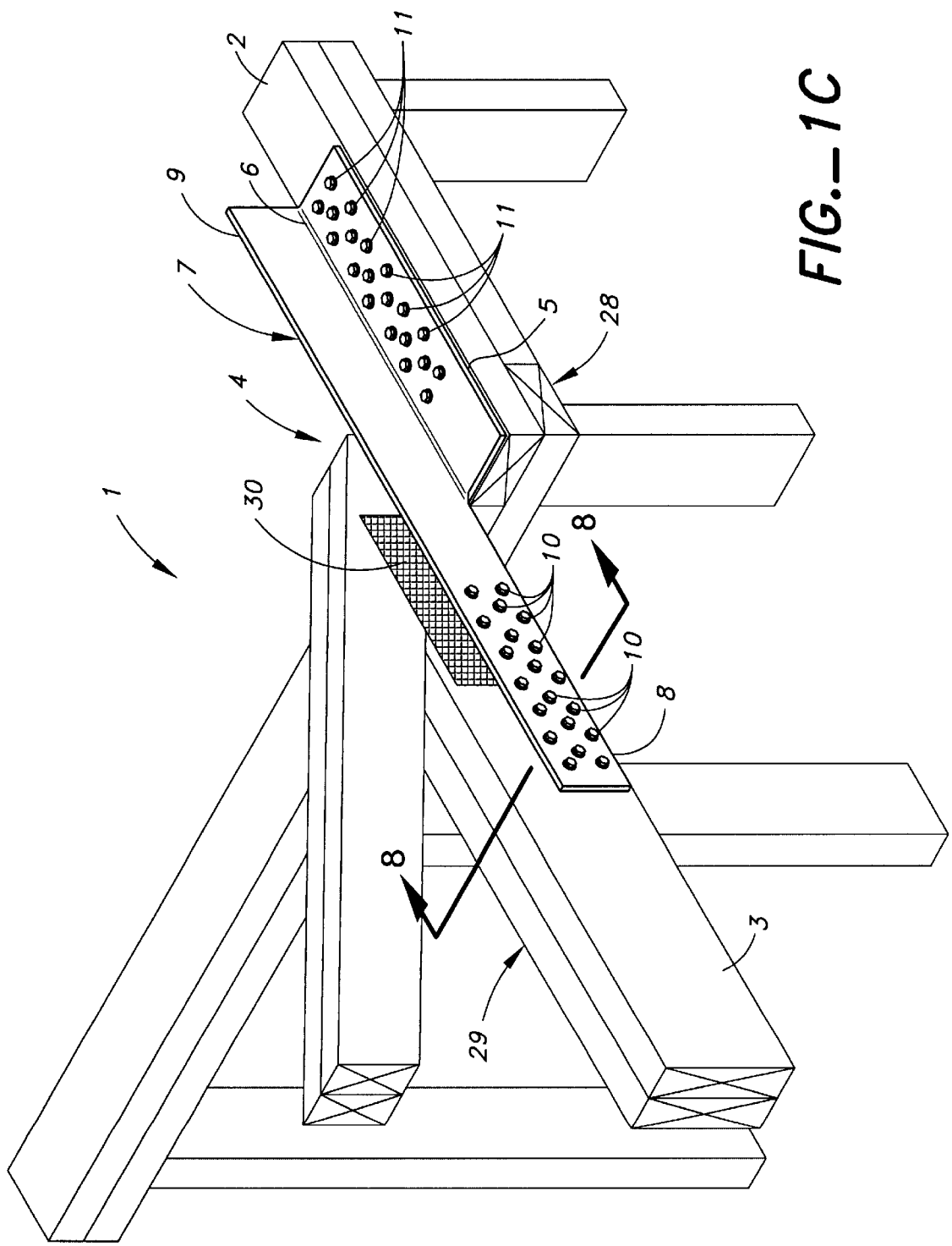
FIG._1C

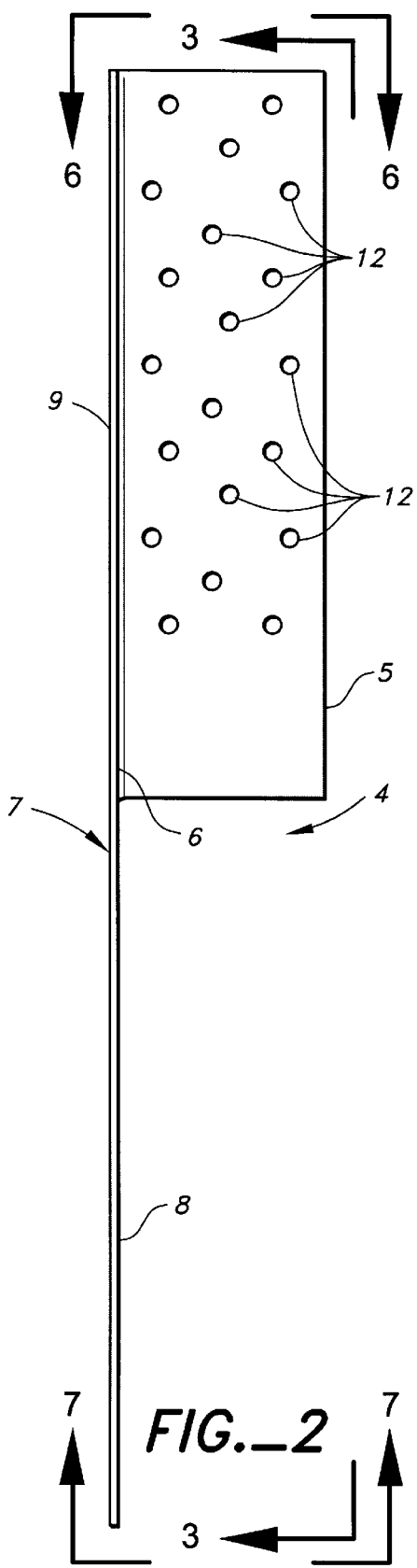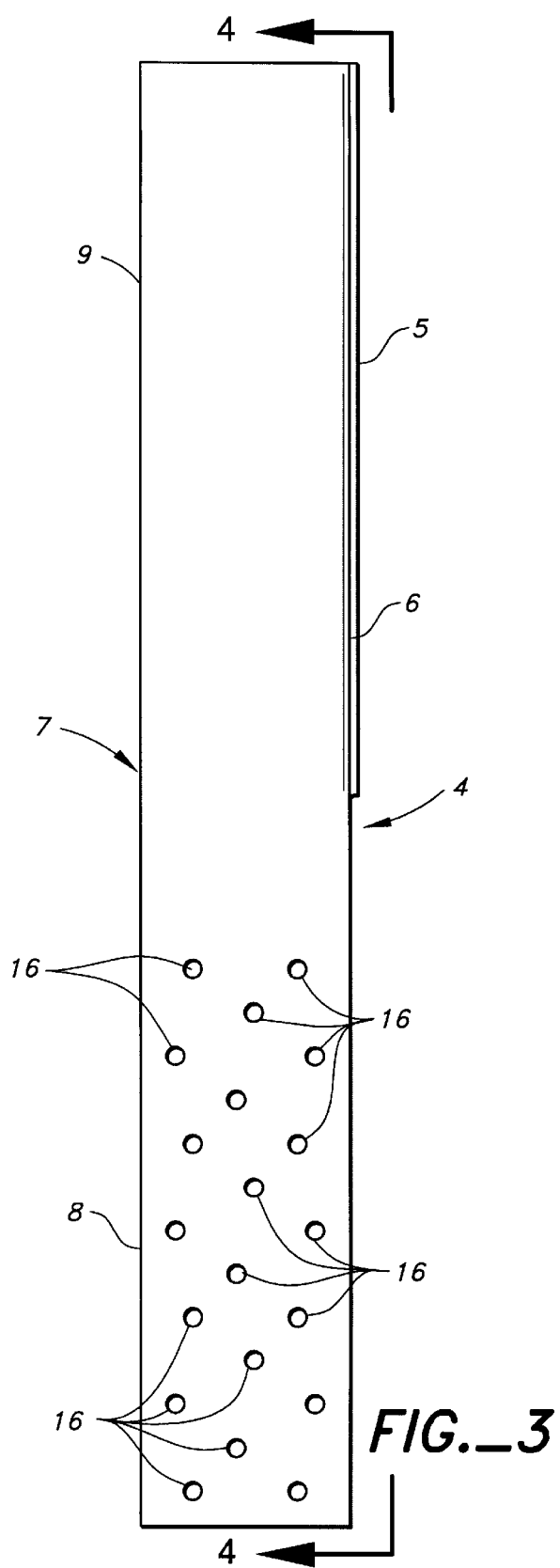
FIG._2    FIG._3

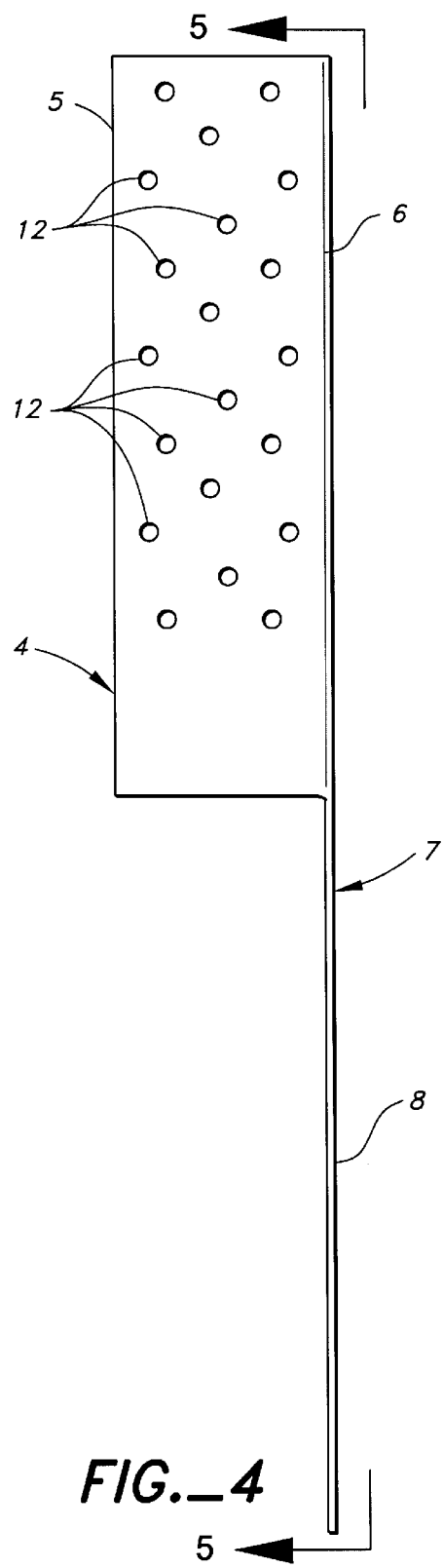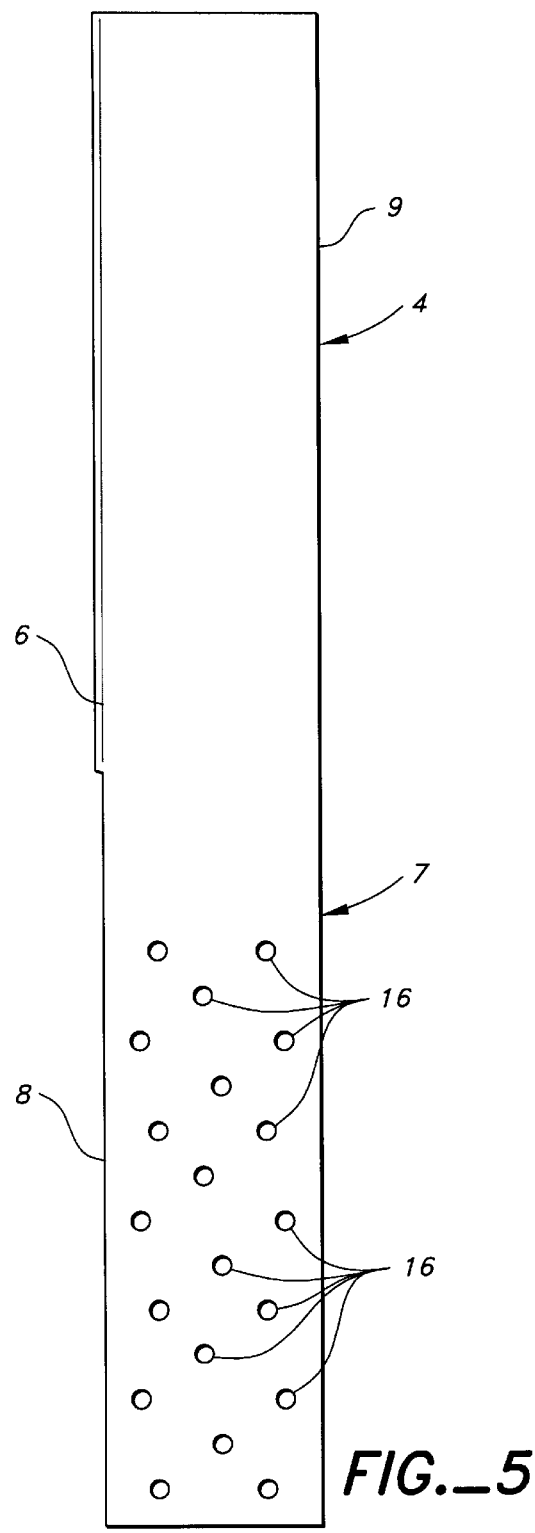
FIG._4  FIG._5

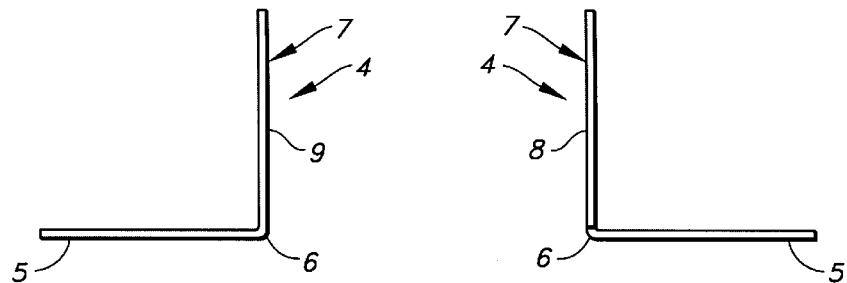
FIG._6     FIG._7
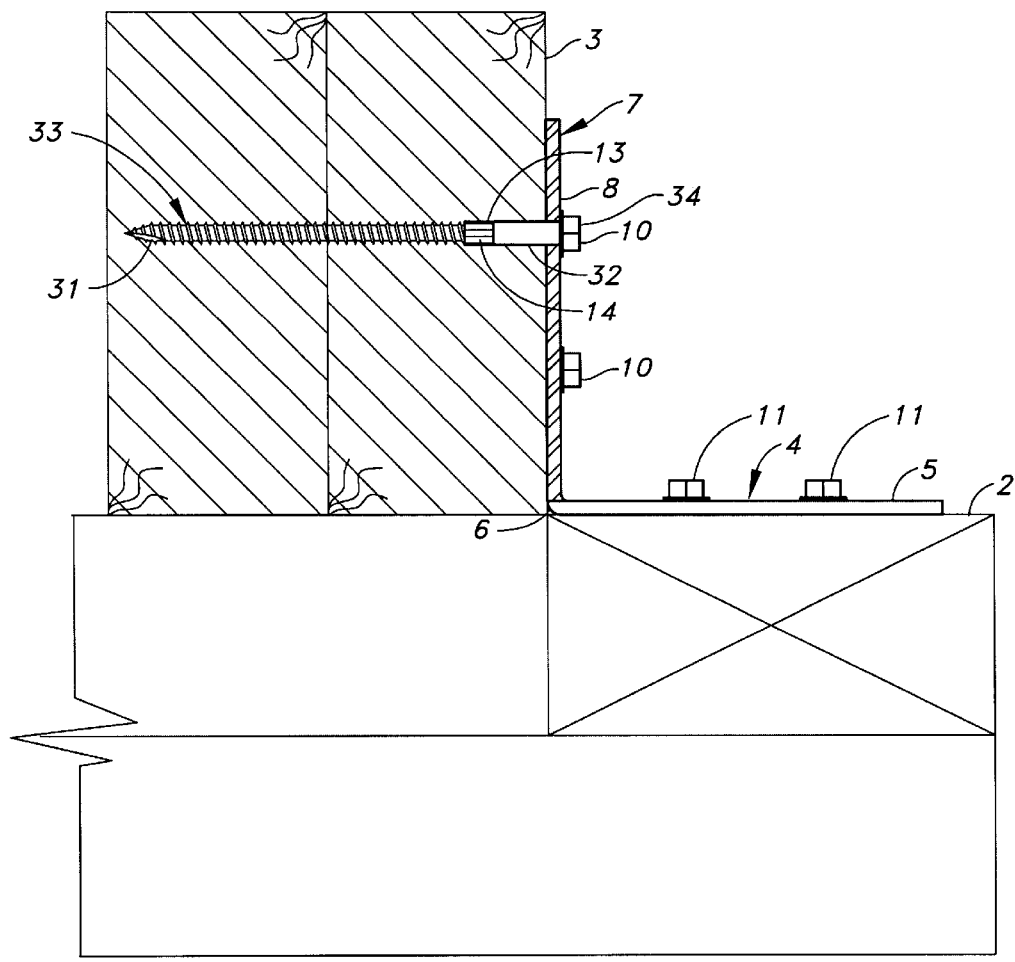
FIG._8

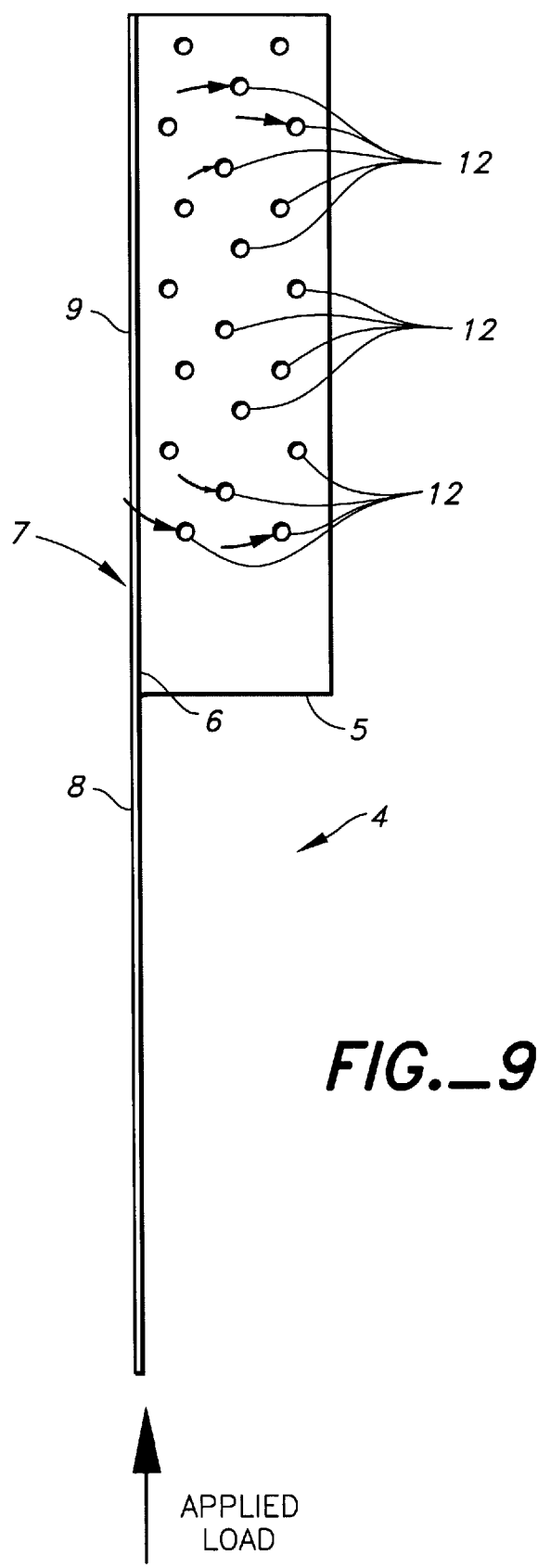
FIG._9

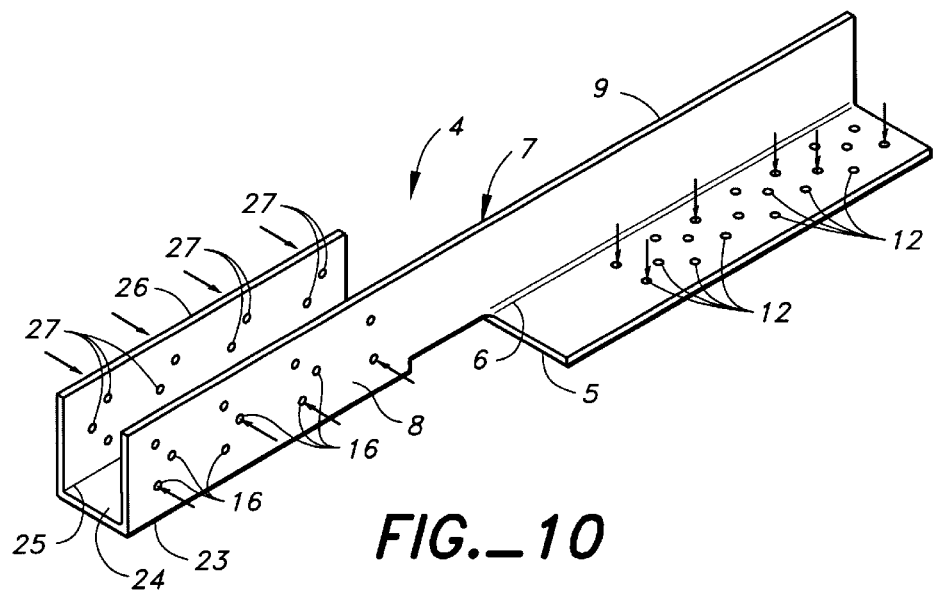
FIG._10
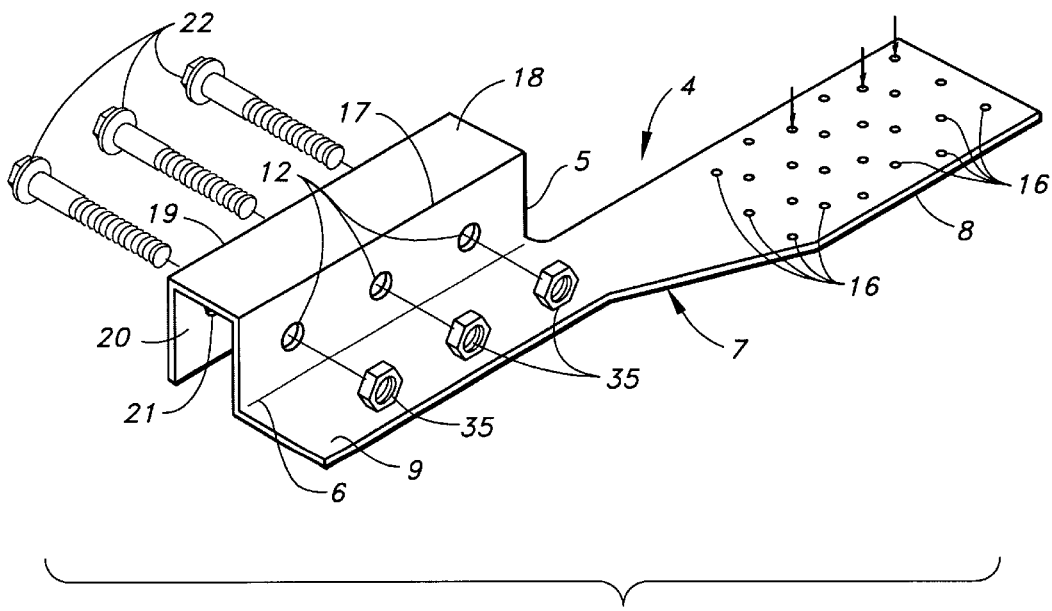
FIG._11

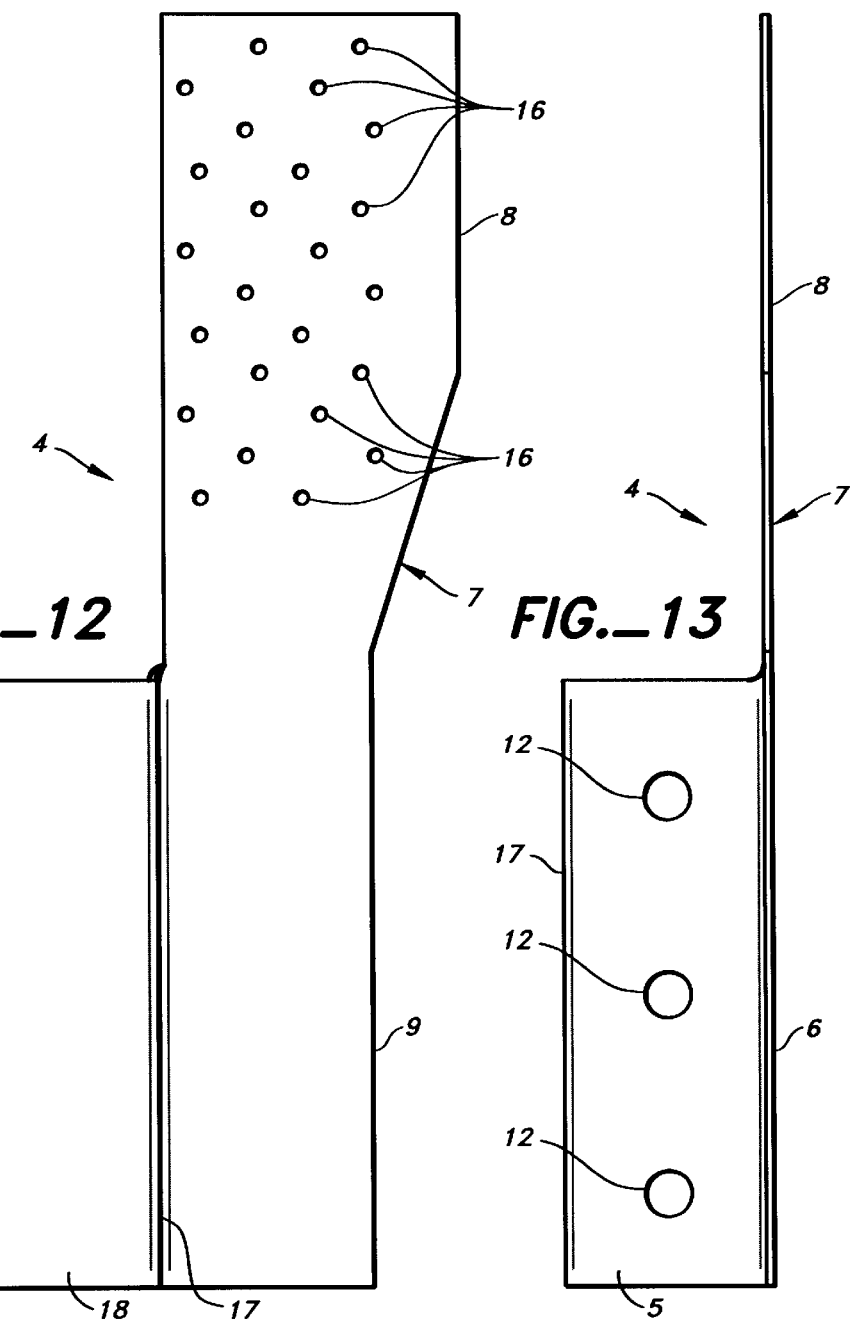

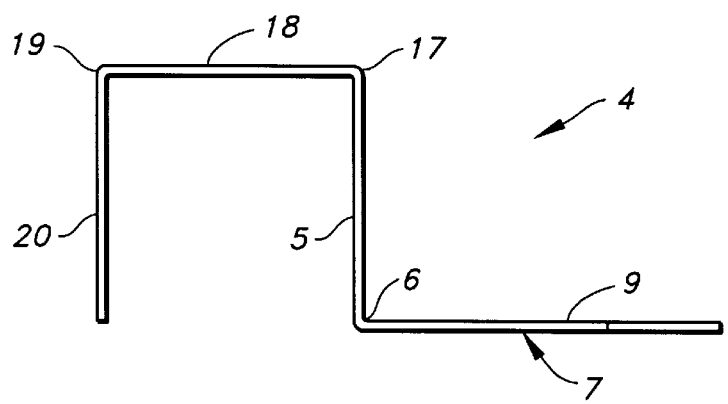
FIG._14
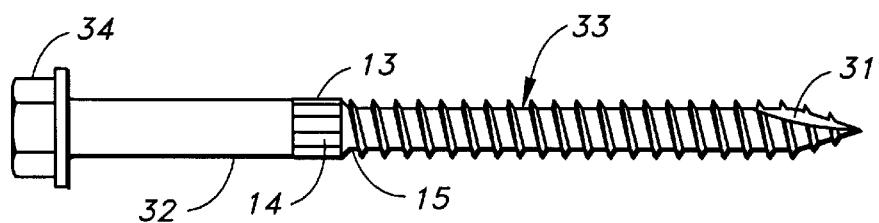
FIG._15

DRAG STRUT CONNECTOR

BACKGROUND OF THE INVENTION

The present invention relates to connectors for attaching walls to beams or trusses that are offset from the wall and act as collectors in the lateral force resisting system.

The main purpose of a drag strut connector is to connect a beam or truss to the top plate of a colinear bearing wall, thereby completing the load path and allowing loads to be transferred out of the roof or floor sheathing into the wall system where the shearwalls are. Such a beam or truss is referred to as a load "collector" or "drag strut".

In the past, engineers would have to line up the drag strut with the wall, and then use straps and blocking to tie the truss to the wall. The strap accommodated tension loads and the blocking was intended to absorb compression loads (although, in practice, the blocking could not normally be installed tightly enough to work properly). In order to work, the truss had to be lined up directly with the wall, and this required a different setup than the rest of the trusses, which increased the cost of the building.

In order to save this additional cost, the truss can be set back, but this requires a connector that accommodates the offset. In the past, a piece of angle iron, usually 3"×3", typically of ¼" thickness, was modified by cutting off one leg and it was bolted to the wall top plates and the truss. Bolted connections, however, suffer a number of disadvantages, particularly when resisting shear forces as in the connection of the present invention.

Bolts are larger than screws, so connections must be made with fewer bolts than screws. This means that the percentage of load transferred to each bolt is higher and the pressure exerted by each bolt on the framing members is greater, increasing the chance that the framing members will be damaged by the bolts. Also, if multiple bolts are not all perfectly installed, loading will be uneven and this can cause wood framing members to split. Because screws are smaller than bolts, more can be used to make each connection. Although each individual screw may be weaker than the bolt that would otherwise be used for the connection, the greater number of screws means that the percentage of load transferred to each screw will be less, thereby reducing the chance that the framing members will be damaged by the screws.

Bolts are relatively large, and therefore cannot typically be staggered, and are therefore installed in-line. In a connection like that of the present invention, this means that they act together to damage the framing members, particularly along the grain of wood framing members, which can be split. Because screws are relatively small, screw fastener openings may be staggered, lessening the chance that they will damage and split framing members.

A relatively small number of bolts are used to make a connection, so the spaces between the bolts are relatively large, and these spaces correspond to unreinforced areas of the connector, which may fail by buckling in these areas. Because a relatively large number of screws may be used to make a connection, the spaces between them may be relatively small and the array of screws reinforces the connector against buckling.

Bolts are larger in diameter than screws used for the same application, and the amount of material that must be removed for each fastener from both the connector and the connected members is greater for bolts and creates a weaker connection. Furthermore, it is difficult to accurately cut large bolt holes and this makes it difficult to align large-diameter bolts in a multiple-bolt connection. Because screws are smaller in diameter than bolts, the amount of material that must be removed for each fastener from both the connector and the connected members is less, creating a stronger connection.

Conventionally, the bolt holes in connectors and the bolt holes drilled through wood framing members are 1/16" larger in diameter than the bolts inserted therethrough. This play in the connection allows for some acceleration of the connector under load, transferring greater stresses to the rest of the building structure and creating impact forces in the bolt holes, thereby increasing the chance that the wood framing members will be split by the bolts. Screw fasteners cannot accelerate under load because there is little or no play in a screw connection, whether the screw is self-drilling and creates its own hole or whether the screw hole is pre-drilled. In neither case is the screw hole oversized. The same is true for the fastener openings that accommodate screws in connectors, which are made to fit the intended screws as closely as possible.

Bolts pass through the members they connect. Under load, torque is generated and the bolts act as wedges, splitting or otherwise damaging the framing members, as in the prior art. Screws do not penetrate through the framing members and therefore do not act as wedges.

SUMMARY OF THE INVENTION

The key to the present invention is that it uses self-drilling screws to create a superior connection to that achieved with a similar connector and bolts.

An object of the present invention is to provide a connector that accommodates offset of the connected beams or trusses from the wall.

A further object of the present invention is to provide a connector that can take both compression and tension loads, because the loads being transferred out of the roof or floor truss reverse.

A further object of the present invention is to provide a connector that is more resistant to buckling than the prior art.

A further object of the present invention is to provide a connector that can take higher compression and tension loads than the prior art.

A further object of the present invention is to provide a connector that reduces splitting of the held and holding members as compared to the prior art.

A further object of the present invention is to provide a connector that can be mass-produced.

A further object of the present invention is to provide a connection that is less expensive to make than the prior art.

A further object of the present invention is to provide a connection that is less time-consuming to make than the prior art.

BRIEF DESCRIPTION OF THE DRAWINGS

FIG. 1A is a perspective view of the prior art connector.

FIG. 1B is a perspective view of a preferred embodiment of the connector of the present invention.

FIG. 1C is a perspective view of the connection of the present invention, without fasteners. The arrows show the direction in which fasteners are inserted through the connector of the present invention.

FIG. 2 is a top plan view of the connector of the present invention taken along arrows 2—2 in FIG. 1B.

FIG. 3 is a side elevation view of the connector of the present invention taken along arrows 3—3 in FIG. 2.

FIG. 4 is a bottom plan view of the connector of the present invention taken along arrows 4—4 in FIG. 3.

FIG. 5 is a side elevation view of the connector of the present invention taken along arrows 5—5 in FIG. 4.

FIG. 6 is a back elevation view of the connector of the present invention taken along arrows 6—6 in FIG. 2.

FIG. 7 is a front elevation view of the connector of the present invention taken along arrows 6—6 in FIG. 2.

FIG. 8 is a cross sectional view of the connection of the present invention taken along arrows 8—8 in FIG. 1C.

FIG. 9 is a top plan view of the connector of the present invention. The large arrow shows the direction of applied load and the smaller arrows show the directions of the resulting moment forces.

FIG. 10 is a perspective view of an alternate preferred embodiment of the connector of the present invention.

FIG. 11 is a perspective view of another alternate preferred embodiment of the connector of the present invention.

FIG. 12 is a side elevation view of the alternate preferred embodiment of the connector of the present invention shown in FIG. 11.

FIG. 13 is a top plan view of the alternate preferred embodiment of the connector of the present invention shown in FIG. 11.

FIG. 14 is a front elevation view of the alternate preferred embodiment of the connector of the present invention shown in FIG. 11.

FIG. 15 is a side elevation view of preferred embodiment of the fastening means of the present invention.

DETAILED DESCRIPTION OF THE DRAWINGS

FIG. 1 shows the connector of the prior art, an angle iron with a piece cut out to form a base member and side member with bolt holes in each.

The preferred embodiment of the present invention is set forth in FIGS. 1B through 9. The invention consists of a building frame connection 1. The building frame connection 1 includes a bearing member 2, a borne member 3, a connector 4, a plurality of screw fasteners 10 and fastening means 11. The connector 4 has a base member 5 with a first edge 6 and side member 7 with an attachment portion 8 and a connection portion 9, the connection portion 9 being integrally connected to the base member 5 along the first edge 6. The plurality of screw fasteners 10 attach the borne member 3 to the attachment portion 8; the fastening means 11 attach the bearing member 2 to the base member 5.

FIG. 1B shows the preferred embodiment of the connector 4 of the present invention. The connector 4 has a base member 5 with a first edge 6 and side member 7 with an attachment portion 8 and a connection portion 9, the connection portion 9 being integrally connected to the base member 5 along the first edge 6. The base member 5 has a plurality of fastener openings 12 and the attachment portion 8 also has a plurality of fastener openings 16. In the preferred embodiment, the connector 4 is bent out of a single piece of sheet steel. In the preferred embodiment, the plurality of fastener openings 12 and the plurality of fastener openings 16 are staggered.

FIG. 1C shows the preferred embodiment of the connection 1 of the present invention. The base member 5 of the connector 4 is attached to the bearing member 2 with fastening means 11. In the preferred embodiment, the bearing member 2 is the top plate of a bearing wall 28 and, as shown, the double top plate of a wood frame bearing wall 28. In the preferred embodiment, fastening means 11 are self-drilling screws, ideally Simpson Strong-Drive wood screws. The attachment portion 8 of the connector 4 is attached to the borne member 3 by the plurality of screw fasteners 10. In the preferred embodiment, the borne member 3 is a truss or beam and, as shown, the bottom chord of a plated roof truss 29 with the nail plate 30 visible. In the preferred embodiment, the screw fasteners 10 are self-drilling, ideally Simpson Strong-Drive wood screws.

FIGS. 2 through 7 show different views of the preferred embodiment of the connector 4 of the present invention shown in FIGS. 1B and 1C.

FIG. 8 is a cross-section of the preferred embodiment of the connection 1 of the present invention. It shows the borne member 3 in cutaway, with one of the screw fasteners 1 0 attaching the borne member 3, in this case the bottom chord of a roof truss 29, to the attachment portion 8 of the connector 4 of the present invention. The screw fastener 10 illustrated shows the cutting tip 31, the knurled portion 13, the smooth portion 32 of the shank 33, and the hex washer head 34 all characteristic of the Simpson Strong-Drive wood screw. The Simpson Strong-Drive wood screw, being both self-drilling and knurled, achieves superior shear resistance and, therefore, a stronger connection 1.

FIG. 9 shows the preferred embodiment of the connector 4 of the present invention. The straight arrow shows how lateral load is applied, while the curved arrows show the rotational forces that result from the eccentricity of the lateral load in relation to the base member 5. The curved arrows show the rotational forces of both forward and reverse lateral loading.

FIG. 10 shows an alternate preferred embodiment of the connector 4 of the present invention in which the attachment portion 8 has a plurality of fastener openings 16 and a fourth edge 23, the connector 4 has a joining member 24 integrally connected to the attachment portion 8 along the fourth edge 23, the joining member 24 has a fifth edge 25, and the connector 4 has a flank member 26 with a plurality of fastener openings 27 that is integrally connected to the joining member 24 along the fifth edge 25.

FIG. 11 shows an alternate preferred embodiment of the connector 4 of the present invention. In this embodiment, the base member 5 has a second edge 17, the connector 4 has a connecting member 18 integrally connected to the base member 5 along the second edge 17, the connecting member 18 has a third edge 19, and the connector 4 has a seat member 20 integrally connected to the connecting member 18 along the third edge 19. In this alternate preferred embodiment of the connector 4 of the present invention, the base member 5 has a plurality of fastener openings 12, the seat member 20 has a matching plurality of fastener openings 21, and a plurality of bolt fasteners 22 pass through the opposed fastener openings 16 and 21, fastening with nuts 35.

FIGS. 12 through 14 show different views of the alternate preferred embodiment of the connector 4 of the present invention shown in FIG. 11.

FIG. 15 shows the preferred embodiment of the screw fastener of the present invention, with its characteristic cutting tip 31, tapering entering portion 15, knurled portion 13, the dull edges 14 of the knurled portion 13, and the smooth portion 32 of the shank 33 below the hex washer head 34.

I claim:

1. A building frame connection comprising:
   a. a top plate;
   b. a borne member that is colinear with and offset from said top plate;
   c. a connector having a base member with a first edge and a side member with an attachment portion and a connection portion, said connection portion being integrally connected to said base member along said first edge;
   d. a first plurality of self-drilling screw fasteners attaching said borne member to said attachment portion; and
   e. fastening means attaching said top plate to said base member.

2. The connection of claim 1 in which said fastening means is a second plurality of self-drilling screw fasteners.

3. The connection of claim 2 in which said attachment portion has a plurality of fastener openings and a fourth edge, said connector has a joining member integrally connected to said attachment portion along said fourth edge, said joining member has a fifth edge, and said connector has a flank member with a plurality of fastener openings that is integrally connected to said joining member along said fifth edge.

4. The connection of claim 2 in which said top plate is made of wood and said base member has a plurality of fastener openings.

5. The connection of claim 4 in which said first plurality of screw fasteners and said second plurality of screw fasteners have a shank with a knurled portion.

6. The connection of claim 5 in which said knurled portion is formed with a plurality of knurls having dull edges.

7. The connection of claim 6 in which said knurls are formed with a tapering entering portion.

8. The connection of claim 7 in which said borne member is a bottom chord of a roof truss.

9. The connection of claim 2 in which said borne member is made of wood and said attachment portion has a plurality of fastener openings.

10. The connection of claim 9 in which said first plurality of screw fasteners and said second plurality of screw fasteners have a shank with a knurled portion.

11. The connection of claim 10 in which said knurled portion is formed with a plurality of knurls having dull edges.

12. The connection of claim 11 in which said knurls are formed with a tapering entering portion.

13. The connection of claim 12 in which said borne member is a bottom chord of a roof truss.

14. The connection of claim 2 in which said top plate is made of wood, said base member has a plurality of fastener openings, said borne member is made of wood, and said attachment portion has a plurality of fastener openings.

15. The connection of claim 14 in which said first plurality of screw fasteners and said second plurality of screw fasteners have a shank with a knurled portion.

16. The connection of claim 15 in which said knurled portion is formed with a plurality of knurls having dull edges.

17. The connection of claim 16 in which said knurls are formed with a tapering entering portion.

18. The connection of claim 17 in which said borne member is a bottom chord of a roof truss.

19. The connection of claim 1 in which said base member has a second edge, said connector has a connecting member integrally connected to said base member along said second edge, said connecting member has a third edge, and said connector has a seat member integrally connected to said connecting member along said third edge.

20. The connection of claim 19 in which said bearing member is made of wood, said base member has a plurality of fastener openings, said seat member has a matching plurality of fastener openings, and a plurality of bolt fasteners pass through said fastener openings and said bearing member, holding said bearing member between said base member and said seat member.

21. The connection of claim 20 in which said screw fasteners are self-drilling.

22. The connection of claim 21 in which said screw fasteners have a shank with a knurled portion.

23. The connection of claim 22 in which said knurled portion is formed with a plurality of knurls having dull edges.

24. The connection of claim 23 in which said knurls are formed with a tapering entering portion.

25. The connection of claim 19 in which said bearing member is made of wood, said base member has a plurality of fastener openings, said borne member is made of wood, said attachment portion has a plurality of fastener openings, said seat member has a matching plurality of fastener openings, and a plurality of bolt fasteners pass through said fastener openings and said bearing member, holding said bearing member between said base member and said seat member.

26. The connection of claim 25 in which said screw fasteners are self-drilling.

27. The connection of claim 26 in which said screw fasteners have a shank with a knurled portion.

28. The connection of claim 27 in which said knurled portion is formed with a plurality of knurls having dull edges.

29. The connection of claim 28 in which said knurls are formed with a tapering entering portion.

30. The connection of claim 29 in which said borne member is a bottom chord of a roof truss.

* * * * *